US006528784B1

(12) United States Patent
Tang et al.

(10) Patent No.: US 6,528,784 B1
(45) Date of Patent: Mar. 4, 2003

(54) MASS SPECTROMETER SYSTEM INCLUDING A DOUBLE ION GUIDE INTERFACE AND METHOD OF OPERATION

(76) Inventors: Keqi Tang, 2500 George Washington Way #238, Richland, WA (US) 99352; Alan E. Schoen, 16810 Bohlmon Rd., Saratoga, CA (US) 95070; Jean-Jacques Dunyach, 373 River Oaks Cir., #2010, San Jose, CA (US) 95134

( * ) Notice: Subject to any disclaimer, the term of this patent is extended or adjusted under 35 U.S.C. 154(b) by 49 days.

(21) Appl. No.: 09/715,815

(22) Filed: Nov. 16, 2000

Related U.S. Application Data

(63) Continuation-in-part of application No. 09/454,273, filed on Dec. 3, 1999, now abandoned.

(51) Int. Cl.[7] .......................... B01D 59/44; H01J 49/00
(52) U.S. Cl. ....................................................... 250/282
(58) Field of Search .......................................... 250/282

(56) References Cited

U.S. PATENT DOCUMENTS 4,963,736 A 10/1990 Douglas et al. ............. 250/292
5,157,260 A 10/1992 Mylchreest et al. ..... 250/423 R
5,179,278 A 1/1993 Douglas ..................... 250/290
5,432,343 A 7/1995 Gulcicek et al. ............ 250/288
5,652,427 A * 7/1997 Whitehouse et al. ....... 250/282
5,811,800 A 9/1998 Franzen et al. ............. 250/288
5,852,294 A 12/1998 Gulcicek et al. ............ 250/292
6,015,972 A 1/2000 Hager ........................ 250/282
6,107,623 A 8/2000 Bateman et al. ............ 250/282

OTHER PUBLICATIONS

Yost, R.A. and Enke, C.G., "Triple Quadrupole Mass Spectrometry for Direct Mixture Analysis and Structure Elucidation", *Analytical Chemistry,* vol. 51, No. 12 (Oct. 1979) p. 1251, 1252, 1256 and even pages through 1264.

Dawson, P.H. and Fulford, J.E. "The Effective Containment of Parent Ions and Daughter Ions in Triple Quadrupoles Used for Collisional Dissociation", *Int. Journal of Mass Spectrometry and Ion Physics,* 42 (1982) 195–211.

Teloy, E. and Gerlich, D., "Integral Cross Sections for Ion–Molecule Reactions. 1. The Guided Beam Technique", *Chemical Physics* 4 (1974) 417–427.

Jarrold, Martin F. et al., "A crossed beam study of the reaction of $CO^+$ with $O_2$", *Molecular Physics* (1980) vol. 39, No. 4, 787–798.

(List continued on next page.)

*Primary Examiner*—Jack Berman
*Assistant Examiner*—Johnnie L Smith, II
(74) *Attorney, Agent, or Firm*—Dorsey & Whitney

(57) ABSTRACT

There is described an interface for delivering ions generated in an ion source into a mass analyzer in a chamber under vacuum pressure. In particular, the interface employs two consecutive ion guides operated to dissociate adduct ions formed in the ion source or high pressure regions of the interface between the ion source and the mass analyzer, thus improving the limit of detection or limit of quantitation of the mass analyzer by increasing the analyte ion current.

9 Claims, 8 Drawing Sheets

OTHER PUBLICATIONS

McIver, Jr., Robert, et al., "Coupling a Quadrupole Mass Spectrometer and a Fourier Transform Mass Spectrometer", *Int. J. Mass Spectrometry and Ion Processes,* 64 (1985) 67–77.

Hagg, Conny and Szabo, Imre, "New Ion–Optical Devices Utilizing Oscillatory Electric Fields. IV. Computer Simulations of the Transport of an Ion Beam Through an Ideal Quadrupole, Hexapole, and Octopole Operating in the RF–Only Mode", *Int. J. Mass Spectrometry and Ion Processes,* 73 (1986) 295–312.

Smith, Richard D., et al., "Capillary Zone Electrophresis—Mass Spectrometry Using an Electrospray Ionization Interface", *Anal. Chem.* (1988) 60, 436–441.

Beu, Steven C., et al., "Fourier–Transform Electrospray Instrumentation for Tandem High–Resolution Mass Spectrometry of Large Molecules", *Am Soc for Mass Spectrometry,* (1993) 1044–0305.

Yost, R.A. et al., "Triple Quadrupole Mass Spectrometry for Direct Mixture Analysis and Structure Elucidation", *Analytical Chemistry,* vol. 51, No. 12 (Oct. 1979) p. 1251, 1252, 1256 and even pages through 1264.

Dawson, P.H. et al., "The Effective Containment of Parent Ions and Daughter Ions in Triple Quadrupoles Used for Collisional Dissociation", *Int. Journal of Mass Spectrometry and Ion Physics,* 42 (1982) 195–211.

Teloy, E. et al., "Integral Cross Sections for Ion–Molecule Reactions, 1. The Guided Beam Technique", *Chemical Physics* 4 (1974) 417–427.

Jarrold, M.F. et al., "A crossed beam study of the reaction of $CO^+$ with $O_2$", *Molecular Physics* (1980) vol. 39, No. 4, 787–798.

Mciver, Jr., R.., et al., "Coupling a Quadrupole Mass Spectrometer and a Fourier Transform Mass Spectrometer", *Int. J. Mass Spectrometry and Ion Processes,* 64 (1985) 67–77.

Hagg, Conny and Szabo et al., "New Ion–Optical Devices Utilizing Oscillatory Electric Fields. IV. Computer Simulations of the Transport of an Ion Beam Through an Ideal Quadrupole, Hexapole, and Octopole Operating in the RF–Only Mode", *Int. J. Mass Spectrometry and Ion Processes,* 73 (1986) 295–312.

Smith, R.D. et al., "Capillary Zone Electrophoresis—Mass Spectrometry Using an Electrospray Ionization Interface", *Anal. Chem.* (1988) 60, 436–441.

Beau, S.C. et al., "Fourier–Transform Electrospray Instrumentation for Tandem High–Resolution Mass Spectrometry of Large Molecules", *Am. Soc. for Mass Spectrometry,* (1993) 1044–0305.

* cited by examiner

MASS SPECTROMETER SYSTEM INCLUDING A DOUBLE ION GUIDE INTERFACE AND METHOD OF OPERATION

RELATED APPLICATIONS

This application is a continuation-in-part-of- and claims priority to pending application Ser. No. 09/454,273 filed Dec. 3, 1999 now abanadoned.

FIELD OF THE INVENTION

This invention relates generally to mass spectrometry, and more particularly to mass spectrometers employing atmospheric pressure ion sources such as electrospray or atmospheric pressure chemical ionization. More particularly, the invention relates to the use of two consecutive ion guides between the ion source and the mass analyzer to dissociate adduct ions, thus increasing the ion current for the analytically useful molecular species.

BACKGROUND OF THE INVENTION

Generally, the interface between the atmospheric pressure ion source and the mass analyzer includes a capillary tube or other restrictive aperture which determines ion and gas throughput between the atmospheric pressure ionization region and a lower pressure region. The ions are drawn through the capillary or other restrictive aperture and directed to a downstream conical skimmer with a small aperture through which the sample ions flow. A tube lens or other electrostatic or electrodynamic focusing element may be associated with the capillary to force ions to the center of the jet stream leaving the capillary to thereby increase the ion transmission through the aperture of the skimmer. Reference is made to U.S. Pat. No. 5,157,260 which describes the operation of an atmospheric pressure ionization source, capillary lens and conical skimmer. One or more vacuum stages are interposed between the skimmer and the mass analyzer which is operated at vacuum pressures in the free molecular flow region.

The prior art interface vacuum stages have included ion guides to transfer the ions through the stages of decreasing pressure into the mass analyzer. In many prior art systems, the ions are guided by electrostatic lenses. In other systems, the ions are guided by electrodynamic multipole ion guides.

The use of an r.f.-only octopole ion guide for focusing and guiding ion beams has been described by Teloy and Gerlich (Chem. Phys., Vol. 4, p. 417, 1974) and Jarrold et. al. (Mol. Phys., Vol. 39, p. 787, 1980).

The dissociation of mass-selected ions in an r.f.-only quadrupole by collision with a target gas at low translational energies ($E_{lab}$<about 100 eV) has been described by R. A. Yost and C. G. Enke et. al. (Anal. Chem., Vol. 51, p. 1251a, 1979), and Dawson et. al. (Int. J. Mass Spec. Ion Proc., Vol. 42, p. 195, 1982).

McIver et. al. described the use of an r.f.-only quadrupole ion guide for guiding a beam of mass-selected ions into a Fourier-transform ion cyclotron resonance mass analyzer (Int. J. Mass Spec. Ion Proc., Vol. 64, p. 67, 1985).

Szabo described the theory of operation for multipole ion guides with various electrode structures (Int. J. Mass Spec. Ion Proc., Vol. 73, pp. 197–312, 1986).

Efficient transport of ions through vacuum chambers by multipole ion guides has been described by Smith et. al. (Anal. Chem., Vol. 60, pp. 436–441, 1988).

Beu et. al. described the use of three quadrupole ion guides to transport ions from an atmospheric pressure ionization source through three vacuum pumping stages into a Fourier-transform ion cyclotron resonance mass analyzer (J. Am. Soc. Mass Spec., Vol. 4, pp. 557–565, 1993).

U.S. Pat. No. 4,963,736 describes the use of a multipole ion guide in the first pumping stage of a two-stage system. Operation of the multipole ion guide in certain length-times-pressure regimes is claimed for the purposes of enhancing ion signal.

U.S. Pat. Nos. 5,179,278 and 5,811,800 describe the temporary storage of ions in an r.f. multipole rod system for subsequent analysis in an rs.f. quadrupole ion trap mass spectrometer. This is done for the purpose of matching the time scales of compounds eluting from chromatographic or electrophoretic separation devices to the time scale of mass spectrometric analyses performed by an r.f. quadrupole ion trap.

U.S. Pat. No. 5,432,343 describes an ion focusing lensing system for interfacing an atmospheric pressure ionization source to a mass spectrometer. It describes the use of an electrostatic lens in a transition flow pressure region of the interface, claiming benefit of independent adjustment of operating voltages controlling the collisionally induced dissociation and declustering processes. Enhancement of ion beam transmission into the mass analyzer is also claimed.

U.S. Pat. No. 5,652,427 describes in one embodiment a system in which a multipole ion guide extends between two vacuum stages and in another embodiment a system which includes a multipole in each of two adjacent stages. Improved performance and lower cost are claimed.

U.S. Pat. No. 5,852,294 describes the construction of a miniature multipole ion guide assembly.

A goal to be achieved in all single or multiple interface vacuum chambers is to transport as many protonated molecular cations or molecular anions as possible from the atmospheric pressure ionization source to the mass analyzer. However, many solvent adduct ions which are formed in the high pressure region travel through the interface vacuum chambers into the analyzer. The process of solvent adduction in the mass spectrometer system is generally considered to be a non-covalent association between sample ions of interest and neutral solvent molecules. Thus, in the case of introduction of an analyte into an electrospray or atmospheric pressure chemical ionization source, the ion current produced from that analyte may be divided between the protonated molecular cation or molecular anion and one or more solvent adduct species. Specific detection is usually accomplished by monitoring the ion signal, or derivative of that signal, for one specific mass. In the case where solvent adducts are formed, the limit of detection or limit of quantitation for the analyte is reduced.

Experimental evidence indicates that these adduct ions are predominantly formed in the high pressure regions of the system ranging from the API source region through the interface vacuum regions. The degree of adduction varies directly with the pressures in these regions. The formation of adduct ions significantly reduces the abundance of sample analyte ions. Furthermore, the adduct ions which enter into the mass analyzer complicates the mass spectrum and make the identification of mass peaks more difficult.

OBJECTS AND SUMMARY OF THE INVENTION

It is an object of the present invention to provide a mass spectrometer system employing an ion source with multiple ion guides configured and operated to convert adduct ions into sample ions and a method of operating multiple ion guides to convert adduct ions into sample ions to thereby increase the analyte ions current and sensitivity of the mass spectrometer system.

In accordance with the invention, there is provided a mass spectrometer including a mass analyzer disposed in a high vacuum chamber for analyzing ions formed in an ionization source which includes first and second evacuated interface chambers immediately preceding the mass analyzer chamber, with the first interface chamber being at a higher pressure than the second interface chamber, and including a first ion guide for guiding ions from the ion source into said second interface chamber which includes a second multipole ion guide for guiding the ions from the first interface chamber into the high vacuum analyzer chamber for analysis. Both r.f. and DC potentials are applied to the said first and second ion guides to ensure ion focusing and transmission through related vacuum chamber. A first ion lens is disposed at the input of the first interface chamber for directing ions into the first multipole ion guide, an interchamber ion lens is disposed between the first and second interface chambers for directing ions into said second multipole ion guide, and an ion lens or a lens stack is disposed between the second interface chamber and the analyzer chamber for directing ions into said analyzer for analysis. These ion lenses also serve as gas conductance restrictors between said interface chambers.

A DC voltage source is connected to provide a potential difference between the first lens and the first multipole ion guide or between interchamber lens and the second multipole ion guide or both which defines the ion's translational kinetic energy as it enters the second multipole ion guide. The ion's translational kinetic energy is chosen such that at the vacuum pressure of the second interface chamber adduct ions are converted into sample ions by collision induced dissociation without fragmentation of sample ions whereby the sample ion current entering the analyzer is increased, thereby increasing the sensitivity of the mass spectrometer system.

There is provided a method of mass analyzing ions produced in an atmospheric pressure ionization source in which adduct ions formed in the mass spectrometer system are dissociated prior to analysis to increase the analyte ion current to the mass analyzer and the sensitivity of the mass spectrometer system.

There is provided a method of operating a mass spectrometer system in which an analyzer in a vacuum chamber analyzes ions formed in an atmospheric pressure ionization source. The system includes first and second multipole ion guides disposed in serial first and second evacuated chambers immediately preceding the analyzer. The method comprises applying a DC voltage between the ion lens preceding either the first or the second multipole ion guide to provide translational kinetic energy to the adduct ions sufficient to dissociate any adduct ions at the pressure of the second chamber without fragmenting the sample ions whereby to increase the sample ion current directed into the analyzer and the sensitivity of the mass spectrometer system.

BRIEF DESCRIPTION OF THE DRAWINGS

The foregoing and other objects of the invention will be more clearly understood from the following description when read in conjunction with the accompanying drawings in which.

DESCRIPTION OF PREFERRED EMBODIMENTS

Figure 1:
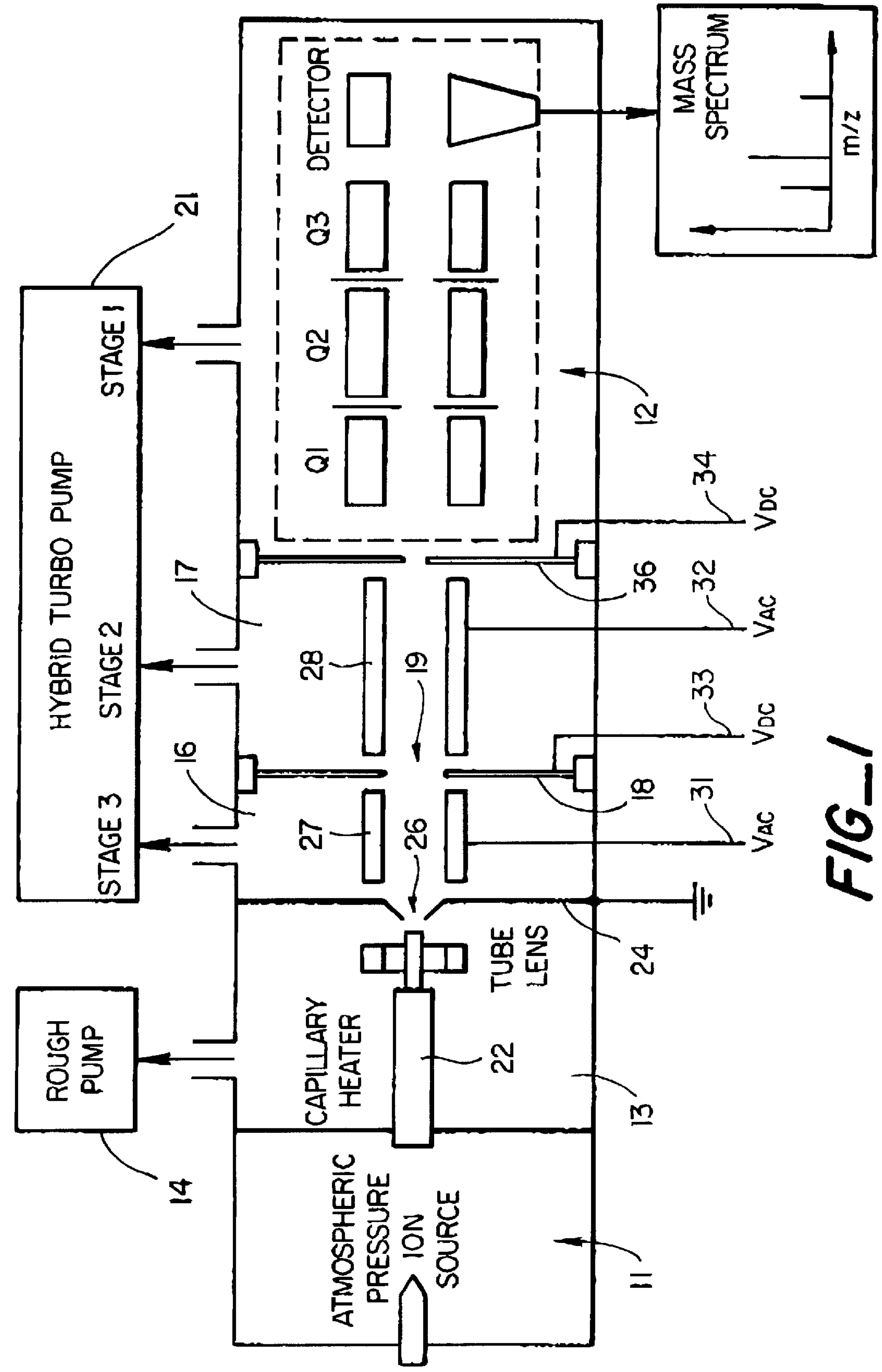
FIG. 1 is a schematic view of a mass spectrometer system including an atmospheric pressure ion source coupled to a tandem mass analyzer through evacuated interface chambers with multipole ion guides.

Referring to FIG. 1, an atmospheric pressure ion source in chamber 11 is interfaced to a tandem mass analyzer 12 via three vacuum pumping stages. The first stage 13 which has the highest pressure is evacuated by an oil-filled rotary vane vacuum pump 14. Other types of vacuum pumps may also be used for this stage, such as a diaphragm pump or scroll pump. A typical pressure for first stage 13 is between 1 and 2 Torr. The second and third stages 16 and 17 are separated by a lens 18 with an orifice 19, which in one example was 1.5 mm in diameter, and can be evacuated by a hybrid or compound turbomolecular pump 21 which includes both turbomolecular and molecular drag pumping stages, and may have multiple inlets into each of these pumping stages, or by individual vacuum pumps (not shown). As will be explained in accordance with the present invention, the pressure in chamber 16 is below 500 mTorr, preferably below 250 mTorr, and more preferably below 175 mTorr; and the pressure in chamber 17 is below 1 mTorr, preferably below 0.7 mTorr, and more preferably below 0.5 mTorr. The pressure in the tandem mass analyzer chamber is approximately $1\times10^{-5}$ Torr or below.

The atmospheric pressure ion source may be an electrospray ion source or atmospheric pressure chemical ionization source. With either ion source, sample liquid is introduced into the chamber 11, which is at atmospheric pressure, and ionized. The ions are drawn through a capillary 22, which may be heated, into chamber 13. The end of the capillary is opposite a conical skimmer 24 which includes a central orifice or aperture 26. The skimmer separates the low pressure stage 13 from the lower pressure stage 16. A portion of the ion and gas flow is skimmed from the free jet expansion leaving the capillary and enters the second lower pressure stage. The ions which travel through the skimmer are guided into the mass analyzer by first and second multipole ion guides 27 and 28. In one example, the ion guides are square quadrupoles. The guide 27 is 1.25 inches long and the guide 28 is 3.37 inches with the rods separated by 0.118 inches (3 mm). The ion guides are mounted coaxially using polycarbonate holders (not shown). The quadrupole ion guides are operated by applying AC voltages 31 and 32 to the poles which guide ions as is well known. Ions which enter the second and third stages drift under the influence of DC voltage 33 applied between the skimmer lens 24 and lens 18, by DC voltage 34 applied between the lens 18 and the lens 36, and by DC offset voltages applied to ion guides 27 and 28.

As discussed above, solvent adduct ions are formed in the high pressure regions ranging from the atmospheric pressure region to the quadrupole ion guide stages or regions. The degree of adduction is believed to vary directly with the pressure in these regions. The formation of adduct ions can significantly reduce the abundance of sample analyte ions which reach the analyzer. Consequently, effective conversion of the adduct ions into protonated molecular cations or molecular anions ions can greatly enhance the sample ion current and the sensitivity of the mass spectrometer system.

We have discovered that the solvent adduct ions can be dissociated and converted into sample ions in the second ion guide 28 by applying a small DC offset voltage between the ion guide 28 and the lens 18 to increase the energy of the solvent adduct ions. An additional 10 volts DC offset applied to the second ion guide (usually used with a standard 5 V DC offset) is sufficient to convert the solvent adducts into the protonated molecular cation or molecular anion for all compounds tested. In addition, this offset voltage is insufficient to cause fragmentation of the analyte ions at the pressure of the second stage.

Both pumping efficiency and solvent adduction were evaluated. The pumping requirement and vacuum condition on the double ion guide system were compared to a standard TSQ 7000 system sold by ThermoQuest Corporation under the same gas load conditions. Several different compounds including a) acetaminophen; b) Alprazolam; c) codeine-d3; d) ibuprofen were used to investigate the degree of solvent adduction, conversion to protonated molecular cation or molecular anion, and fragmentation of the protonated molecular cation or molecular anion. The solvent used in the experiment was 50:50 acetonitrile:water+5mM ammonium acetate adjusted to a pH of 4.5. Table 1 lists the main experimental conditions, compound, molecular weight and type of solvent adduction investigated.

TABLE 1

| Compound | Molecular Weight | Solvent Adduct | Ion Polarity | LC Flow ($\mu$/min) | Sample Injected (ng) |
|---|---|---|---|---|---|
| Acetaminophen | 151 | Acetonitrile | Positive | 400 | 500 |
| Alprazolam | 308 | Acetonitrile | Positive | 400–1000 | 1.6 |
| Codeine-d3 | 302 | Acetonitrile | Positive | 400–1000 | 50 |
| Ibuprofen | 206 | Acetate | Negative | 200 | 50 |

FIGS. 2–7 show the comparative mass spectra for the four different compounds used in the evaluation under standard (±5 V DC) offset and an incremental 10 V DC (±15 V DC total) offset conditions between the interstage ion lens 18 and the second multipole ion guide 28 indicating that the signal intensity and peak area for the protonated molecular cations or molecular anions can be significantly enhanced by the application of the increased DC offset on the second multipole ion guide 28.

Figure 2A:
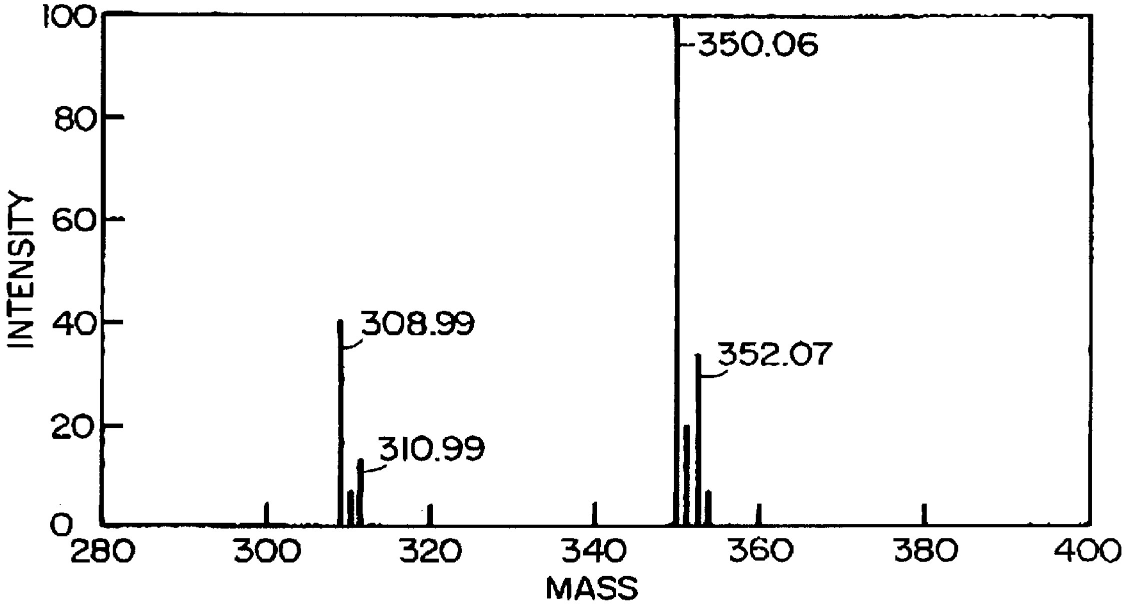
FIGS. 2A and 2B show the mass spectra for an injection of Alprazolam in a liquid stream flowing at 400 microliters per minute (μl/min) with −5 V DC offset and −5 V DC offset applied to the second ion guide.
Figure 2B:
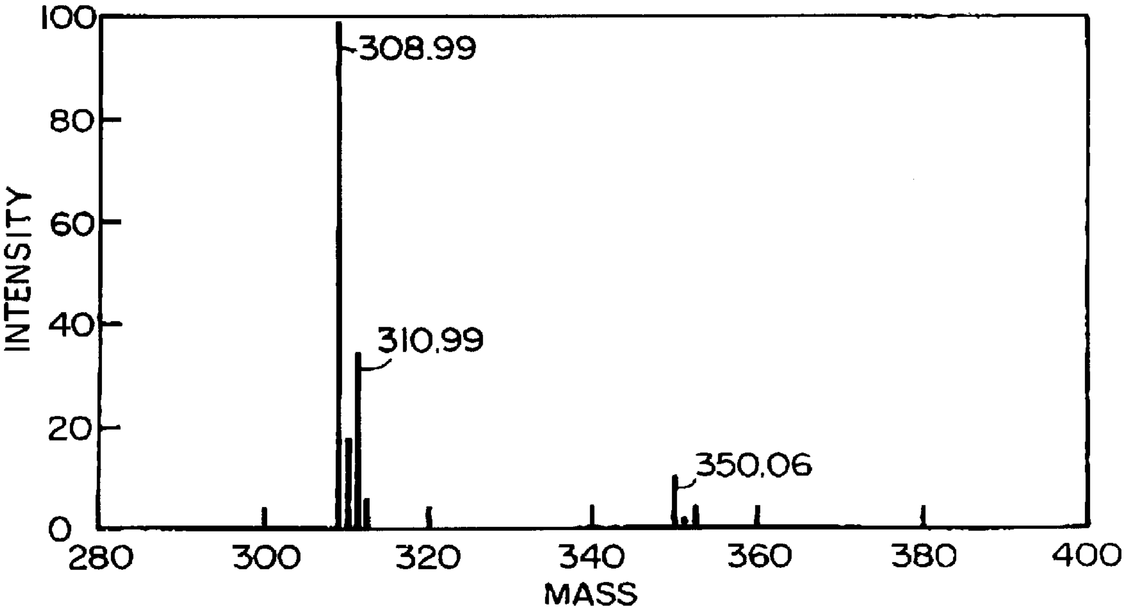

FIG. 2A shows the mass scan for Alprazolam at 400 $\mu$l/min liquid chromatograph flow with the standard −5 volt offset, and FIG. 2B shows Alprazolam with an incremental 10 volts of offset at the same flow rate. The increased sample ion signal produced by the incremental offset voltage is apparent.

Figure 3A:
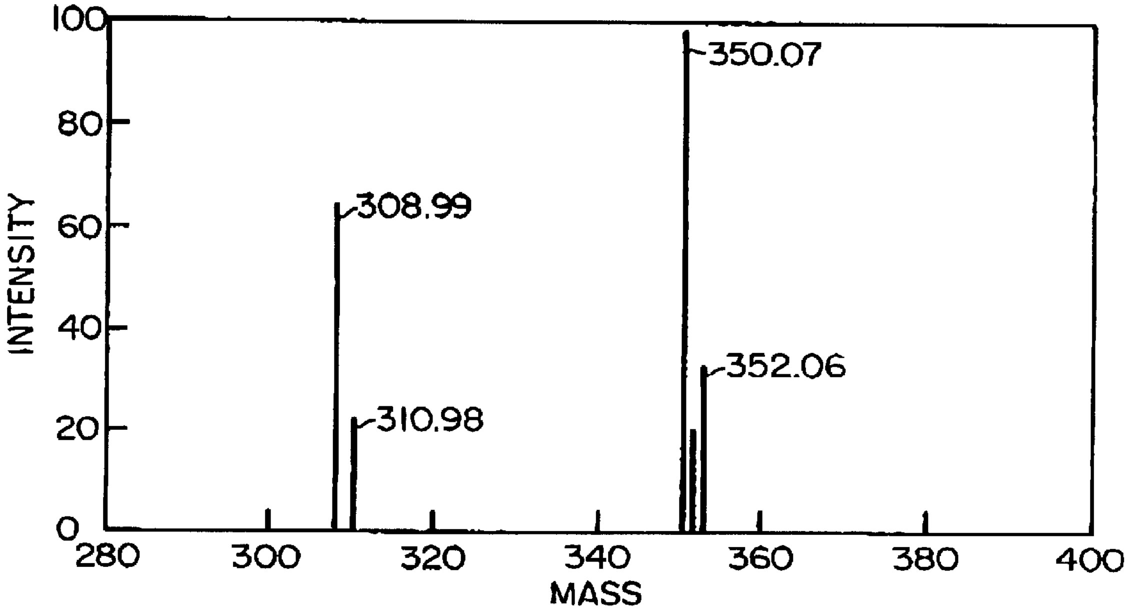
FIGS. 3A and 3B show the mass spectra for an injection of Alprazolam in a liquid stream flowing at 1 milliliter per minute (ml/min) with −5 V DC offset and −15 V DC offset applied to the second ion guide.
Figure 3B:
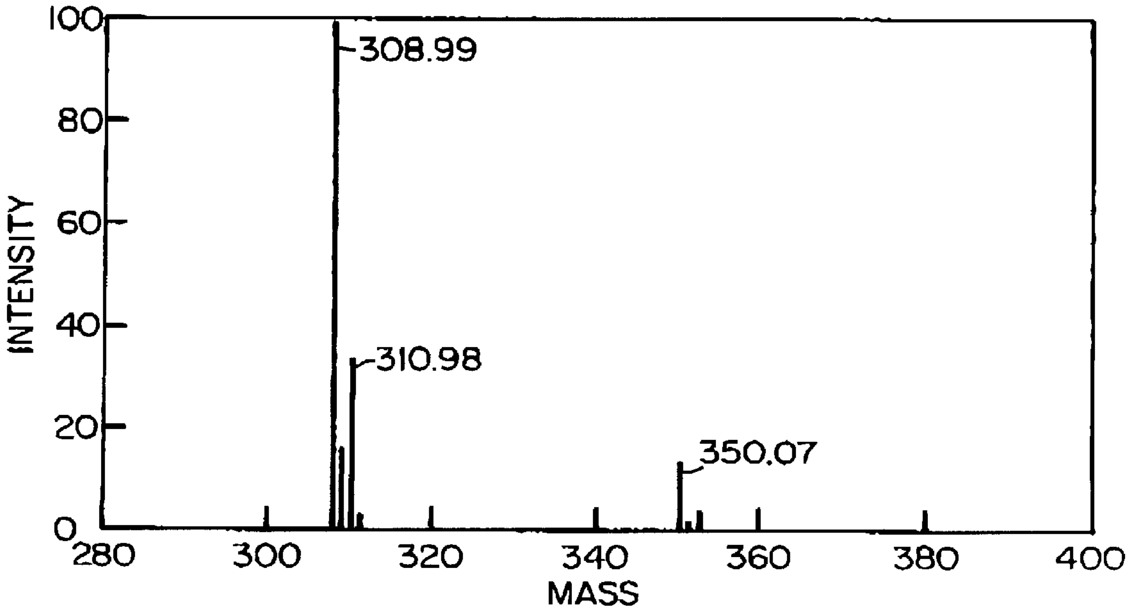
Figure 4A:
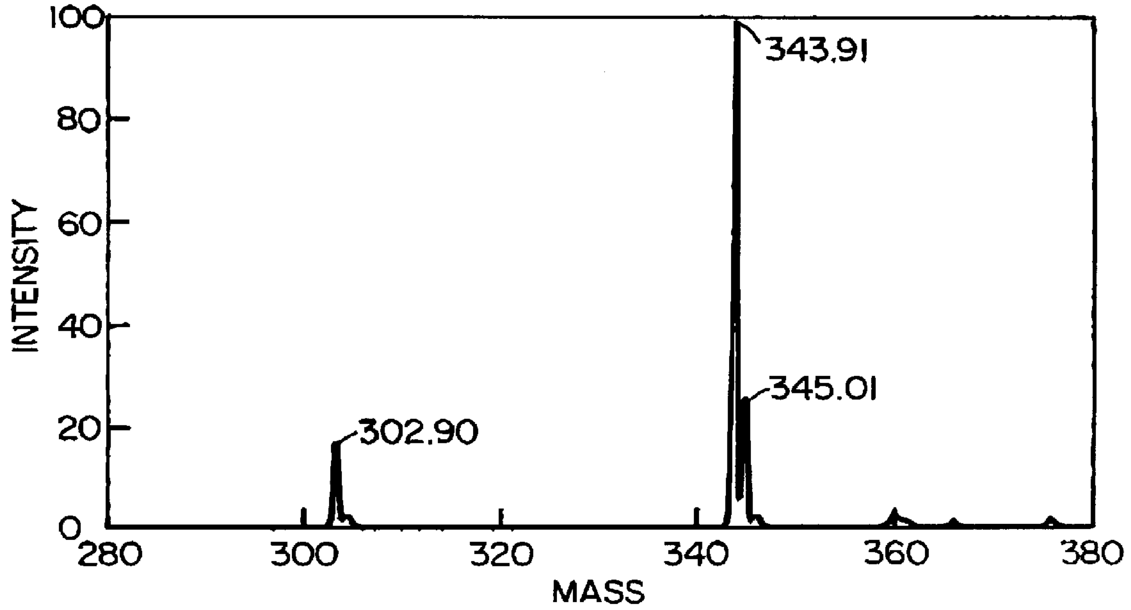
FIGS. 4A and 4B show the mass spectra for an injection of codeine-d3 in a liquid stream flowing at 400 μl/min with −5 V DC offset and −15 V DC offset applied to the second ion guide.
Figure 4B:
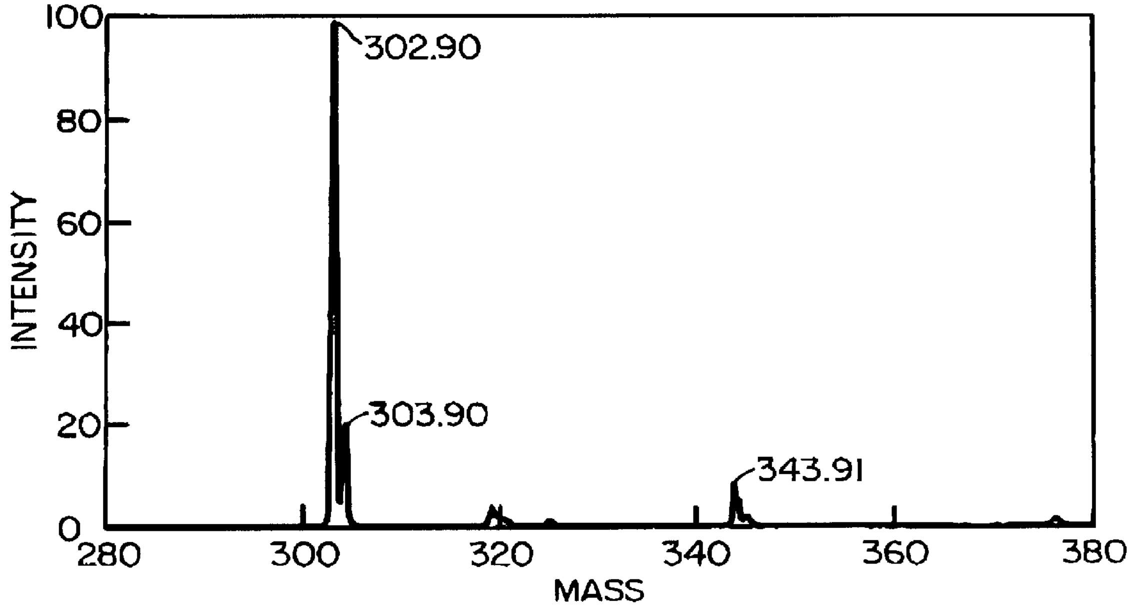
Figure 5A:
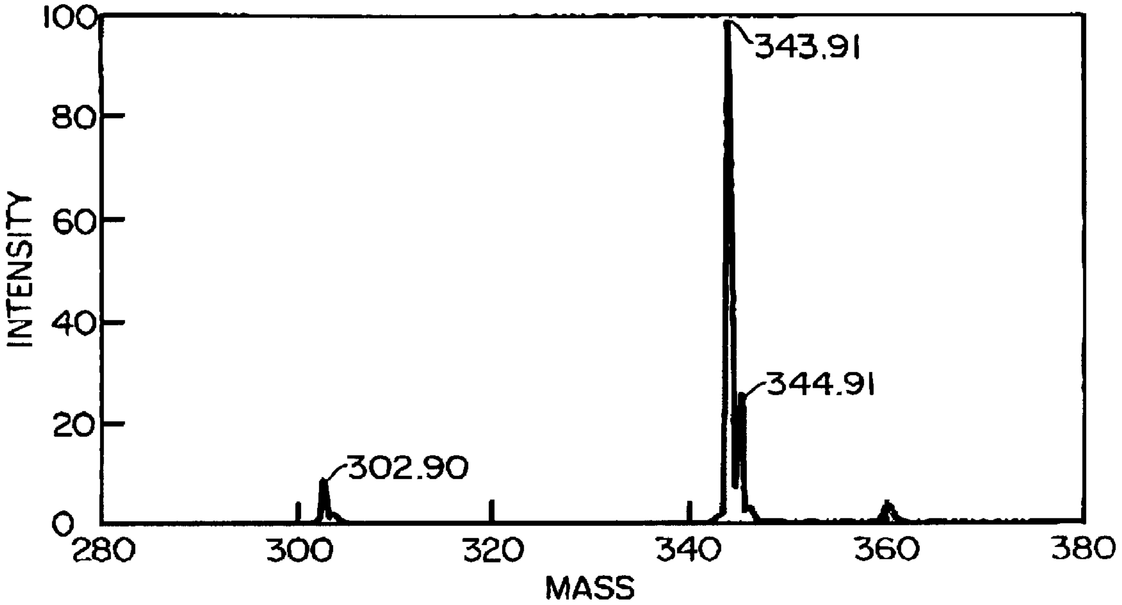
FIGS. 5A and 5B show the mass spectra for an injection of codeine-d3 in a liquid stream flowing at 1 ml/min with −5 V DC offset and −15 V DC offset applied to the second ion guide.
Figure 5B:
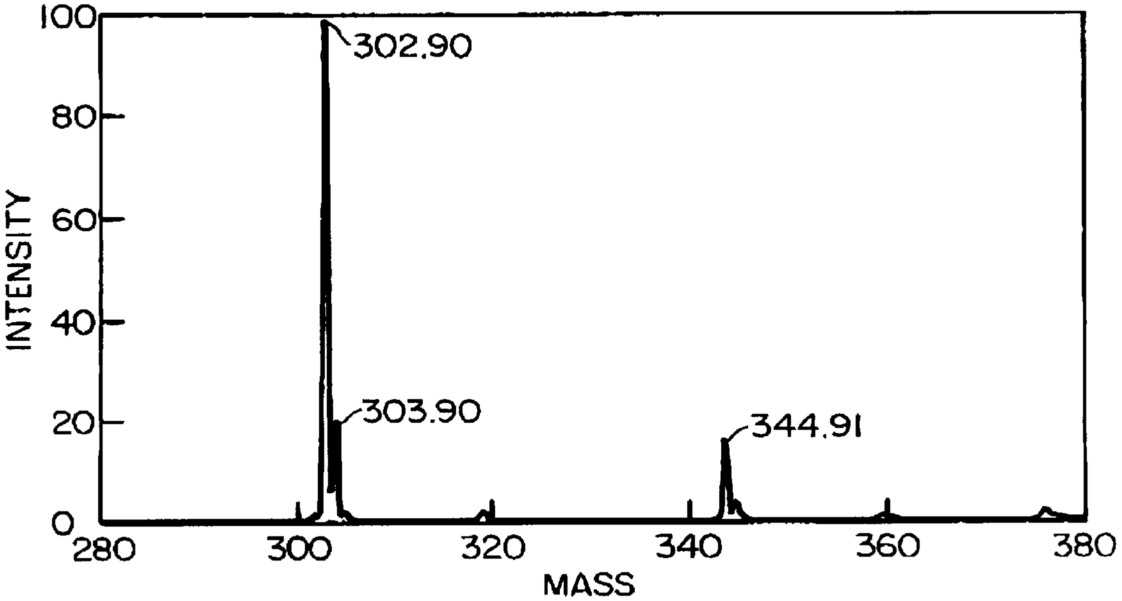
Figure 6A:
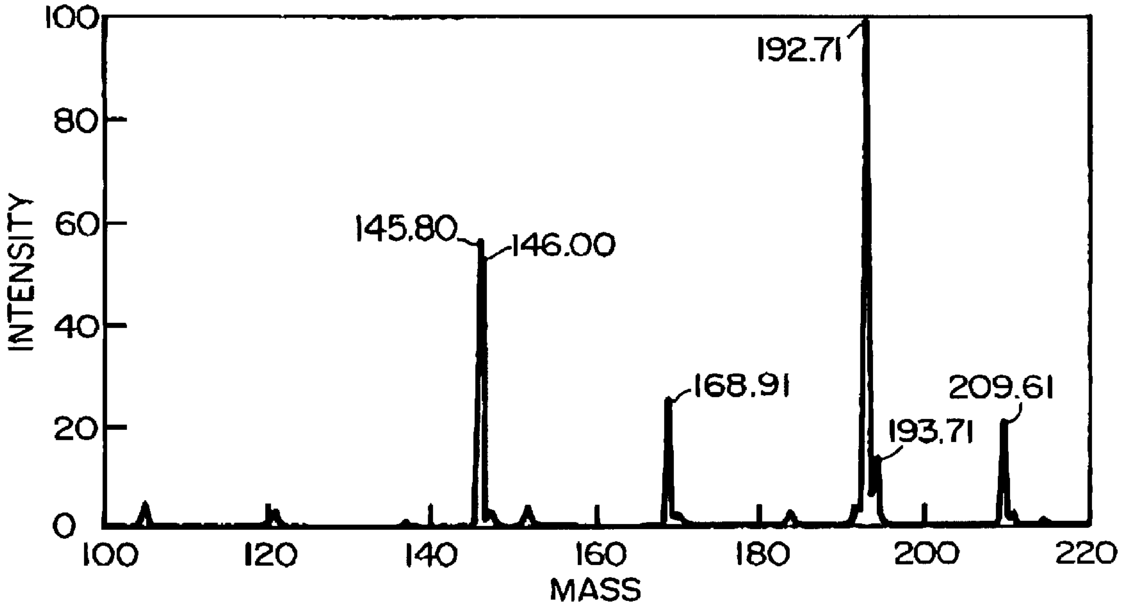
FIGS. 6A and 6B show the mass spectra for an injection of acetaminophen in a liquid stream flowing at 400 μl/min flow with −5 V DC offset and −15 V DC offset applied to the second ion guide.
Figure 6B:
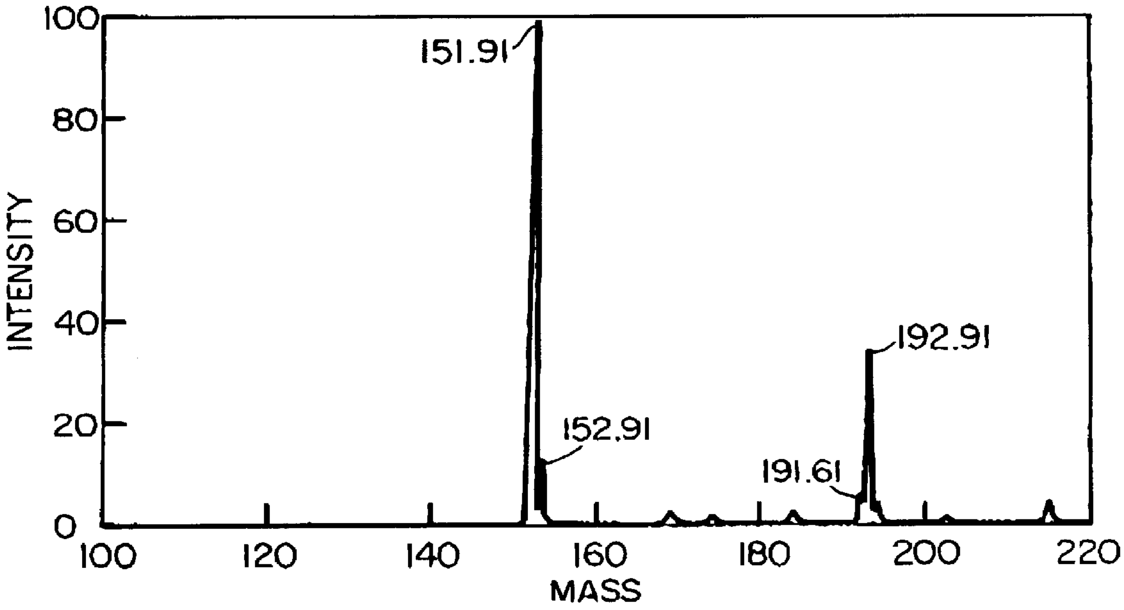
Figure 7A:
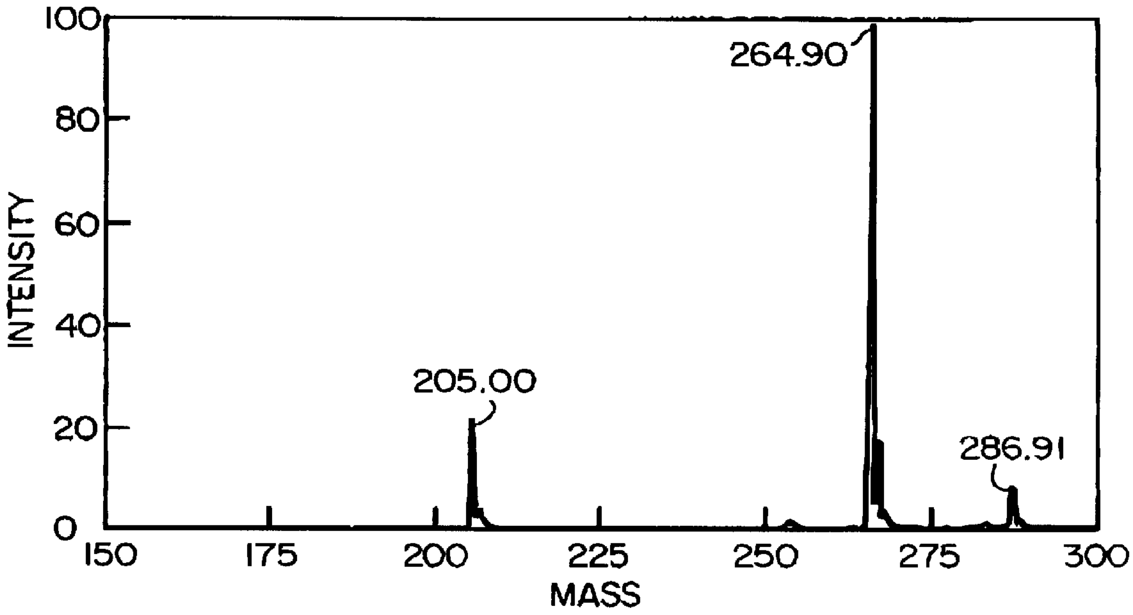
FIGS. 7A and 7B show the mass spectra for an injection of Ibuprofen in a liquid stream flowing at 400 μl/min with +5 V DC offset and +15 V DC offset applied to the second ion guide.
Figure 7B:
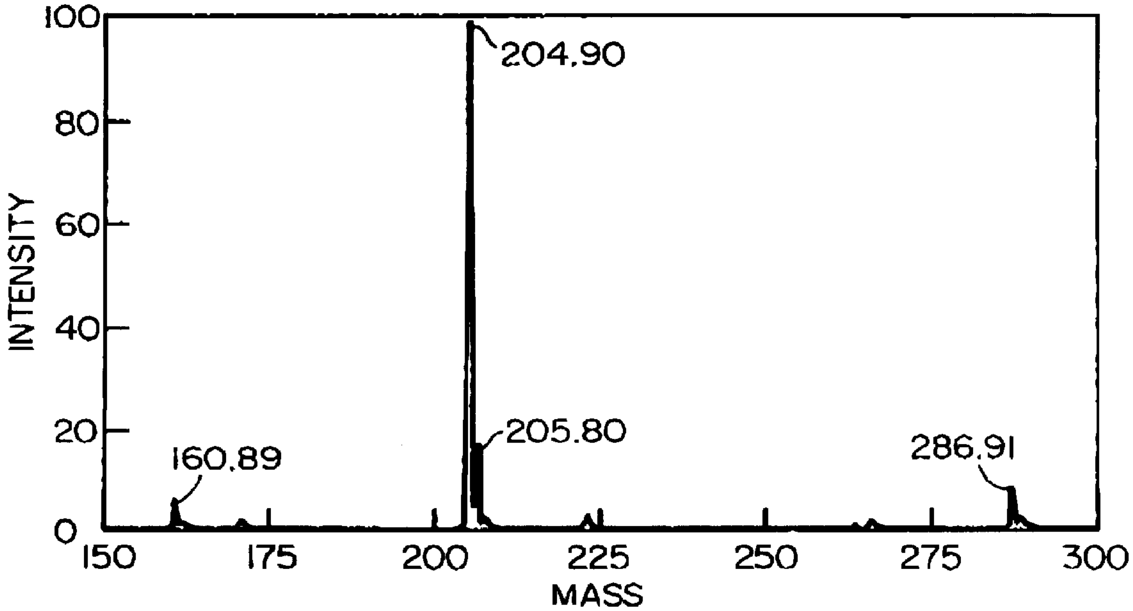

FIGS. 3A and 3B show the mass spectra for Alprazolam at 1 ml/min flow. Again the increased sample ion current is apparent. FIGS. 4A and 4B show the mass spectra for codeine-d3 at 400 $\mu$l/min flow with the standard and increased offset voltages. The increased sample ion signal at m/z 302 is apparent. The same mass spectra are shown for 1 ml/min codeine-d3 in FIGS. 5A and 5B. FIGS. 6A and 6B show a comparison of the mass spectra for Acetaminophen at 400 $\mu$l/min flow with the standard and increased offset voltages. Again, the vast improvement in sensitivity is apparent. FIGS. 7A and 7B show the mass spectra for ibuprofen flowing at 400 $\mu$l/min flow with the standard and increased offset voltages. The improved signal at m/z 205 should be noted.

The DC offset required for high efficiency solvent adduct ion conversion at different vacuum conditions in both first chamber and second chamber was also investigated. The following tables summarize one set of tests in which the ratio of the acetonitrile adduct to the protonated molecular cation of codeine-d3 was investigated at different pressures and different DC offset voltages on the second ion guide.

TABLE 2

| | | | | | |
|---|---|---|---|---|---|
| DC offset on second ion guide (volts) | −5 | −5 | −5 | −5 | −5 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 704% | 926% | 288% | 354% | 248% |
| DC offset on second ion guide (volts) | −15 | −15 | −15 | −15 | −15 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 445% | 407% | 82% | 38% | 17% |
| DC offset on second ion guide (volts) | −35 | −35 | −35 | −35 | −35 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 300% | 248% | 40% | 7% | 3% |

The bold data in Table 2 indicates the range of pressure and offset voltages at which the most efficient conversion of solvent adduct to protonated molecular cation is achieved. According to these results, the operating pressure for the ion guides should be:

First Ion Guide: below 500 mTorr

Second Ion Guide: below 1 mTorr and above 0.1 mTorr

Although the offset voltage which provides the translational kinetic energy to the adduct ions has been described as applied between the interstage lens and the second multipole guide, it is apparent that the translational kinetic energy can be provided by applying the DC offset voltage between the skimmer lens and the first multipole stage or by applying voltages simultaneously between each lens and its respective multipole ion guide. The operating pressure will be the same as above.

The DC offset voltage range for efficient solvent adduction conversion should be ±10 to ±30 Volts, although ±10 V is preferable.

The preferred pressure range is less than 250 mTorr for the first stage and 0.7 mTorr for the second stage, and the most preferred pressure range is less than 175 mTorr for the first stage, and 0.5 mTorr for the second stage.

Figure 8:
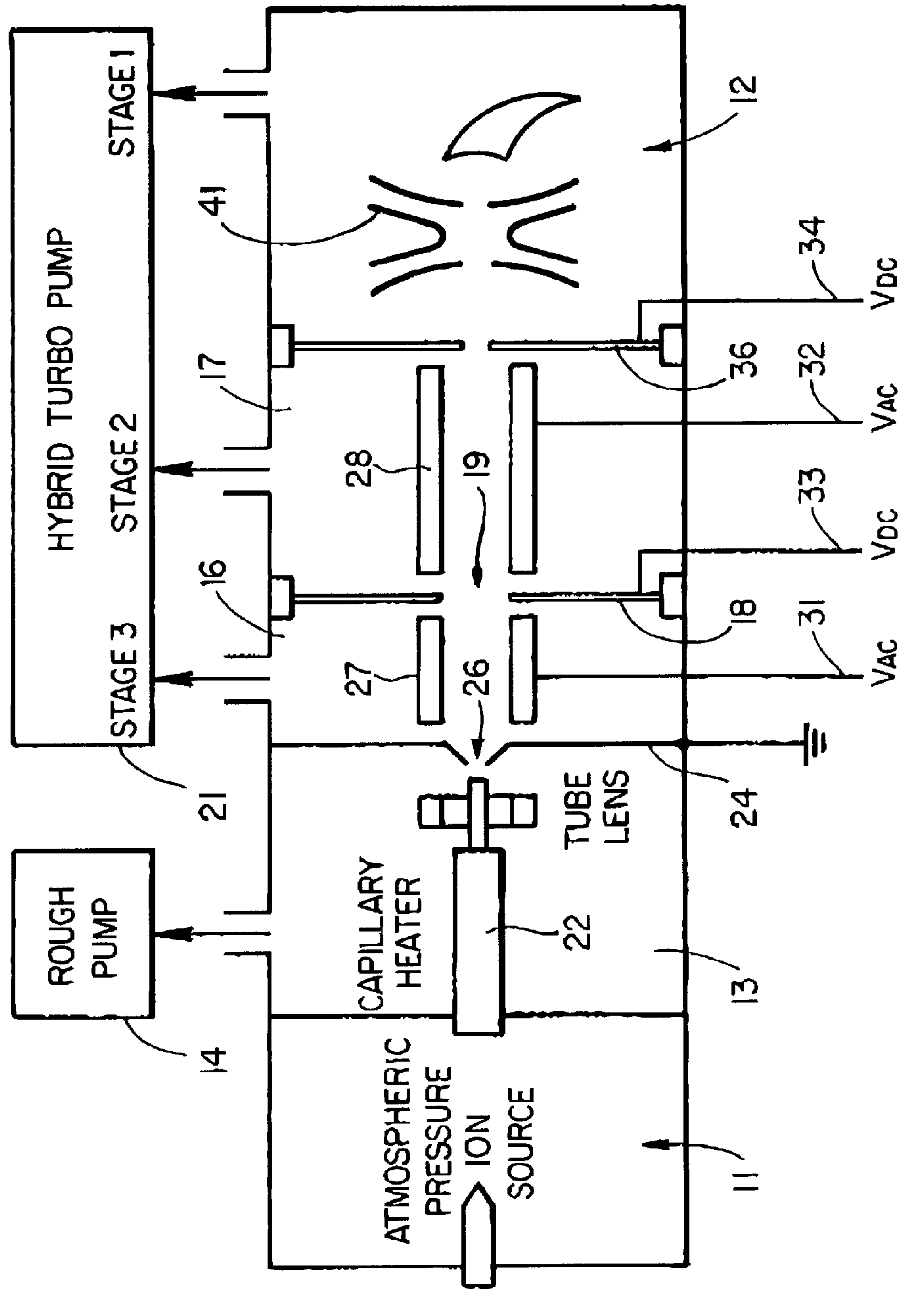
FIG. 8 is a schematic view of a mass spectrometer system as in FIG. 1 with a single quadrupole mass analyzer rather than a tandem mass analyzer or other suitable mass analyzer.

The present invention can be used for other types of mass analyzers such as quadrupole mass analyzers of the type described in U.S. Pat. No. 4,540,884 and U.S. Pat. No. RE 34,000. FIG. 8 shows the interface stages and ion guides associated with a quadrupole mass analyzer 41 disposed in the vacuum chamber 12. Like members have been applied to the parts which correspond to those in FIG. 1. It is apparent that the invention is applicable to other types of mass analyzers such as quadrupole ion trap, ion cyclotron resonance (i.e., magnetic ion trap), time-of-flight, magnetic sector, and double-focusing magnetic/electric sector, monopole, etc.

What is claimed is:

1. A mass spectrometer system including a mass analyzer disposed in a high vacuum chamber for analyzing sample ions formed at atmospheric pressure and directed to the analyzer through intermediate vacuum chambers in which sample ions and solvent molecules form adduct ions with a reduction of sample ion current including:

first and second evacuated chambers directly preceding the mass analyzer chamber with the first chamber being at a higher pressure than the second chamber, a first multipole ion guide in the first chamber for guiding ions into said second chamber, a second multipole ion guide in the second chamber for guiding ions from the first chamber into the high vacuum chamber for mass analysis, and means associated with one or both of said first and second multipole ion guides for increasing the translational kinetic energy of the adduct ions so that at the vacuum pressure of the second interface chamber adduct ions traveling into the chamber are converted into sample ions without fragmentation of sample ions whereby to increase the sample ion current and therefore the sensitivity of the mass spectrometer system.

2. A mass analyzer as in claim 1 including ion lenses preceding each said multipole ion guide and a DC voltage is applied between a selected lens and its associated ion guide to increase the translational kinetic energy of the adduct ions entering the second interface chamber.

3. A method of mass analyzing sample ions produced at atmospheric pressure and introduced into a mass analyzer disposed in a vacuum chamber, and in which some sample ions and solvent molecules combine to form adduct ions with a reduction of sample ions comprising the step of dissociating the adduct ions prior to entry into the mass analyzer to form sample ions to increase the sample ion current entering into the mass analyzer.

4. The method of operating a mass spectrometer system including a mass analyzer which analyzes sample ions formed at atmospheric pressure, and in which some sample ions and solvent molecules combine to form adduct ions with a reduction of sample ions, said system including first and second multipole ion guides disposed in serial first and second evacuated chambers separated by an ion lens for guiding analyte ions into said mass analyzer and an ion lens defining the first evacuated chamber which comprises applying a DC offset voltage between a selected one or both lenses and the succeeding multipole ion guide having an amplitude so as to provide translational kinetic energy to said adduct ions to dissociate the adduct ions without dissociating sample ions at the pressure of the second chamber to increase the sample ion current and the sensitivity of the mass spectrometer system.

5. A mass spectrometer system as in claim 4 in which the pressure in the first chamber is below 500 mTorr, and in the second chamber is below 1 mTorr, and the offset voltage applied between the interchamber lens and the second multipole ion guide is between ±10 volts and ±30 volts.

6. A mass spectrometer system as in claim 5 in which the pressure in the first chamber is less than 250 mTorr, and in the second chamber is less than 0.7 mTorr.

7. A mass spectrometer system as in claim 5 in which the pressure in the first chamber is less than 175 mTorr, and in the second chamber is less than 0.5 mTorr.

8. A mass spectrometer as in claim 6 or 7 in which the offset voltage is ±10 volts.

9. The method of analyzing ions in a mass analyzer which includes a first chamber maintained at a first pressure and a second chamber maintained at a lower pressure comprising the steps of:

forming sample ions at atmospheric pressure with some of the sample ions combining with solvent ions to form adduct ions, guiding said sample ions and adduct ions through at least a first chamber maintained at a first pressure and a second chamber maintained at a lower pressure, adding translational kinetic energy to said adduct ions as they travel through said chambers such that in the second chamber the adduct ions are dissociated without fragmenting the sample ions prior to entering the mass analyzer.

* * * * *

UNITED STATES PATENT AND TRADEMARK OFFICE
CERTIFICATE OF CORRECTION

PATENT NO. : 6,528,784 B1
DATED : March 4, 2003
INVENTOR(S) : Tang et al.

It is certified that error appears in the above-identified patent and that said Letters Patent is hereby corrected as shown below:

Title page,
After Item [76], insert -- [73] Assignee: Thermo Finnigan LLC, San Jose, California --

Signed and Sealed this

Sixteenth Day of December, 2003

JAMES E. ROGAN
*Director of the United States Patent and Trademark Office*